Patented June 22, 1926.

1,589,617

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

PROCESS OF PREPARING MATERIAL FOR CERAMIC ARTICLES.

No Drawing.   Application filed March 1, 1923. Serial No. 621,974.

This invention relates to the preparation of clay and other ingredients from which ceramic articles such as insulators are formed, and has for its object the provision of such a process which shall be convenient, economical and efficient in its operation, and which shall produce improved results.

The invention is exemplified in the steps of the process described in the following specification and it is more particularly pointed out in the appended claims.

In the preparation of clay or body mix for the forming of wet process articles, the clay must be plastic and free from oversize particles or dirt in the finer classes of ware. This is particularly true in the case of high tension insulators and fine china ware where the vitrification and density, as well as dielectric strength, are important factors. A uniform mixture of the various ingredients such as the clays, flint, feldspar, Cornwall stone, whiting or other ingredients used, is necessary in order that the resulting ware will be uniform as to vitrification and dielectric strength in the case of insulators.

In order to obtain a thorough mixture and remove impurities, it has been customary to mix the various ingredients with water in a pebble mill and plunger mill, and then remove the oversize particles and dirt which may be included, by screening or launing. In order to laun or screen out the oversize particles or dirt, it is necessary to add much more water than necessary in the plastic clay required for forming. This excess water must be removed before the clay will have proper consistency, as the mixture or slip must be relatively thin in order to be screened or launed effectively. The screens or "launs" commonly in use are usually from one hundred to one hundred thirty mesh. These fine launs are necessary where the higher grades of ware are to be manufactured and owing to the small mesh there is considerable difficulty in screening the slip unless there is a considerable excess of water.

The slips usually has from 25% to 50% solids, whereas the solids usually must have an excess of 75% to form a plastic material which may be formed and which will hold its shape. From this it will be seen that there is a considerable excess in water which must be removed. This is ordinarily accomplished by means of the filter press which has several objections.

A clay thickened in the filter press is not uniform as to texture or structure. There is a tendency for a larger percentage of finer particles to be deposited on the outside of the filter press cake next to the filter press cloth, and a larger percentage of the coarser particles to accumulate in the center of the leaf or cake. The percentage of water is also greatest in the center of the cake and smallest on the outside of the leaf. This is particularly true in the case of dense plastic body compositions having a large ball clay content. The uneven composition is likely to have serious effects, both in forming and insuring a high dielectric reliability when the material is used for high tension insulators. Any unevenness in the composition tends to cause slight variations in the shrinkage and mechanical strength, which tends to increase cracking, particularly where difficult shapes or heavy pieces are formed from the clay. This is due to the fact that shrinkage strains are set up during the drying operation which tends to cause a weaker section in the composition to fail under the strain.

While this uneven structure is broken up to a certain extent in the kneading or pugging operations, there are likely to be thin streaks which have a tendency to cause cracking, and in addition porous streaks may result if the clay is made into an insulator, so that while the vitrification as a whole is satisfactory the piece may fail thru absorption along a porous streak.

In the improved method the above difficulties are largely eliminated and under usual conditions a marked economy may be effected. In general the improved scheme is essentially as follows:

The flint, feldspar, or other dry pulverized materials are screened dry in order to remove coarse particles. An air operating method may be used for removing the coarse particles or a combination of air separator and screen to insure the complete elimination of lint and coarse particles. In this method it is necessary to dry and pulverize the clays and then remove the oversize particles or dirt either by air separation or by a screen, as outlined above. If clays are very pure it may be possible to simply pulverize same.

As freight is a considerable item in the cost of clays, the clays may have their water content largely reduced before shipment which will reduce the cost of same accordingly. Where the clays are dried out and pulverized, the handling is also greatly simplified and a much greater uniformity results than where the clays are shipped in large chunks having approximately twenty to twenty four percent water.

In many classes of ceramic work it has been customary to keep the clay wet so that its plastic properties would not be affected in any way by the drying out. In the improved method, however, it is not necessary to keep the clay wet as same has to be dried out in order to make use of the process; hence, the clay may be dried, or dried and ground at the mines, effecting not only a saving in freight but a saving in handling.

After screening or purifying the several ingredients required, they are thoroughly mixed in a dry state, using tumbling or stirring equipment commonly used for this operation. It of course is evident that the proper proportions of the various ingredients may be mixed together and then screened or purified. This, however, is usually not satisfactory, as much finer screens can be used on some of the materials than others, insuring a higher degree of purity.

In the purifying process magnetic iron is removed by a magnetic separator of a usual type, as well as by the screens. Following the dry mixing, one of several methods may be used, the final result however is approximately the same.

In one method the thoroly mixed dry material is stored in receptacles with the proper amount of water added to insure the right degree of plasticity for the articles to be formed. The dry mixture and water may be mixed as they enter the storing chamber or they may be placed in layers. The storing chamber should preferably be a large cylindrical chamber such that its temperature may be controlled by the air or by means of a water jacket. Where the temperature is controlled, the curing operation may be greatly hastened as the moisture will distribute itself very rapidly thru the clay by raising the temperature. Where the storing chamber can be tightly closed, the temperature may be raised considerably, as the water cannot escape. A temperature, however, of 170° to 180° Fahrenheit will greatly hasten the distribution of water throughout the mass. By allowing to stand or age the various particles will tend to arrange themselves to form a more dense mass.

In some articles it is not necessary or desirable to have the clay exceedingly dense for the forming as there is less yielding in a dense clay than one which is slightly open with larger porous spaces. Where the composition is such that this porous space is not an objection or where same will be eliminated in the firing operation the process of aging may be arrested and the body composition pugged or kneaded so that same may be formed into the desired articles. Where great density is desired in the clay the process may be varied slightly. One method is to permit time for the alignment of the particles, hastening same by one of several means such as vibration produced by mechanical means. A mechanical vibration of high frequency will tend to effect the whole mass when properly applied and this will tend to give the particles their proper alignment, permitting the settlement of the particles and the escape of air.

Where it is desirable to remove the air content from the clay, temperature and a vacuum may be applied to the mass which will eliminate the air. This will greatly facilitate the settling operation and insure a dense mass.

Where the vacuum is to be applied for any considerable time, it is necessary to add an excess of water during the first mixing operation in order to make up for the water taken out when the vacuum is applied.

The storage chamber may be equipped with an auger mill or other suitable kneading equipment commonly used for plugging clay. This will give the clay the proper grain and shape so that it may readily be handled and formed into the desired articles. Where this is made a part of the storing chamber, the entry of air is prevented and the handling operation is eliminated.

The method has one considerable advantage not mentioned above, and which is an important factor where uniformity of composition is desired. In the ordinary process where the material is handled thru a large part of the process thru a form in the thin slip, there is always a certain amount of settling owing to the difference in specific gravity and size of the particles making up the various ingredients, or to the difference in size of the particles in any one of the ingredients. In order to prevent this serious settling, constant agitation is necessary—but even this cannot prevent a certain amount of settling, particularly where it is not possible to keep the material agitated. In some compositions this settling is serious in the filter press where there is very little flow. The process requires a relatively short time where temperature and vacuum or pressure control is used. Under the best conditions a relatively small amount of material is required in the process in order to get a large output. This permits of equipment such that the temperature of the clay or mixture may be controlled at all stages without involving an excessive cost. This close control of the temperature, as well as the pugging or kneading of an air free mass practically eliminates the trouble from lamination, which is generally a serious source of loss on most ceramic bodies where the pieces of ware have any considerable thickness or size.

While it is not necessary that the material coming from the hydrating chamber be immediately used, it is generally desirable. If desired, however, the material coming from the chamber may be stored in clay cellars in the usual method, permitting continuous operation of the equipment even though the demand for the finished material is not continuous.

I claim:

1. The process of preparing material for ceramic articles, wherein the ingredients are powdered and launed dry, after which sufficient water is added to produce a mix suitable for forming, which mix is permitted to stand in a closed chamber having the pressure therein reduced below atmospheric for a sufficient length of time to permit the water to thoroly permeate the mass.

2. The process of preparing material for ceramic articles, wherein the ingredients are powdered and pulverized in a dry form and mixed with sufficient water to produce a consistency suitable for forming ceramic ware, the moisture being permitted to age to cause the water to thoroly permeate the mass, after which it is worked to properly condition it for forming.

3. The method of preparing material for ceramic articles, wherein the ingredients are dried and pulverized and foreign material separated therefrom while dry, after which water is added and the ingredients and water heated and permitted to stand to cause the water to thoroly permeate the mass, the amount of water added to the dry pulverized clay being only substantially the amount necessary to condition the clay for working.

4. The method of preparing material for ceramic ware, comprising the steps of drying the clay sufficiently to render it non-plastic and easy to pulverize and pulverizing the clay and other ingredients while dry, separating foreign material from the dry powdered ingredients, placing the material in a container together with water, sealing the container and heating the same to cause the water to thoroly permeate the solid constituents of the mix.

5. The method of preparing material for ceramic ware, comprising the steps of drying and pulverizing the solid ingredients, adding only substantially sufficient water to give proper consistency for forming and heating the solid ingredients and water to cause the water to thoroly permeate the mass.

6. The method of preparing material for ceramic ware, wherein the solid ingredients are pulverized dry and sufficient water added to give the desired consistency for forming, the water and solid ingredients being allowed to stand in a closed chamber while heated to facilitate thorough permeation of the mass by the water, after which the mix is worked preparatory to forming.

7. The process of preparing material for ceramic articles, wherein the solid ingredients are powdered and foreign material separated therefrom while dry, after which water is added to give substantially the proper percentage for forming, the water and solid ingredients being permitted to remain in a closed chamber while heated to facilitate thorough permeation of the mass by the water, the mixture being mechanically vibrated to facilitate the formation of a dense body composition.

8. The method of preparing material for ceramic ware, wherein the solid ingredients are pulverized and launed while dry and then mixed with water, the mix being enclosed in a sealed chamber having an agitator therein, the pressure of the chamber being reduced to form vacuum conditions and the contents heated and agitated, sufficient time being permitted to produce thorough permeation of the mass by the water present.

In testimony whereof I have signed my name to this specification on this 24th day of February, A. D. 1923.

ARTHUR O. AUSTIN.